United States Patent [19]

Dosch et al.

[11] 4,199,257

[45] Apr. 22, 1980

[54] PROJECTED RETICLE OPTICAL SIGHTING SYSTEM

[75] Inventors: Thomas J. Dosch, Orchard Park; Ravinder Prakash, Cheektowaga, both of N.Y.

[73] Assignee: Sierra Research Corporation, Buffalo, N.Y.

[21] Appl. No.: 919,203

[22] Filed: Jun. 26, 1978

[51] Int. Cl.² .............................................. G01B 21/10
[52] U.S. Cl. ..................................... 356/252; 343/703
[58] Field of Search ....................... 356/138, 251, 252; 343/703, 840

[56] References Cited

U.S. PATENT DOCUMENTS

| 2,458,831 | 1/1949 | Cady | 356/252 |
|---|---|---|---|
| 2,463,233 | 3/1949 | Alexanderson | 356/251 |
| 3,936,137 | 2/1976 | Litman | 356/252 |
| 3,966,328 | 6/1976 | Wiklund | 356/138 |

FOREIGN PATENT DOCUMENTS 538218  3/1977  U.S.S.R. ................................. 356/251

Primary Examiner—Vincent P. McGraw
Attorney, Agent, or Firm—Dowell and Dowell

[57] ABSTRACT

An optical sighting system for aiming the main operative axis of an apparatus in the direction of a distant target wherein the sighting system includes an optical sighting device fixed to the apparatus and laterally offset from the main axis of the apparatus and a reticle projector fixed to the apparatus and projecting a reticle image into the sighting device along a path parallel to said main operative axis, various embodiments being disclosed including additional features whereby the sighting device is supported on an arm which is separate from another arm coupled to mount a device for directing the projected reticle image into the optical sighting device, the directing device comprising a mirror or a polygonal prism.

10 Claims, 7 Drawing Figures

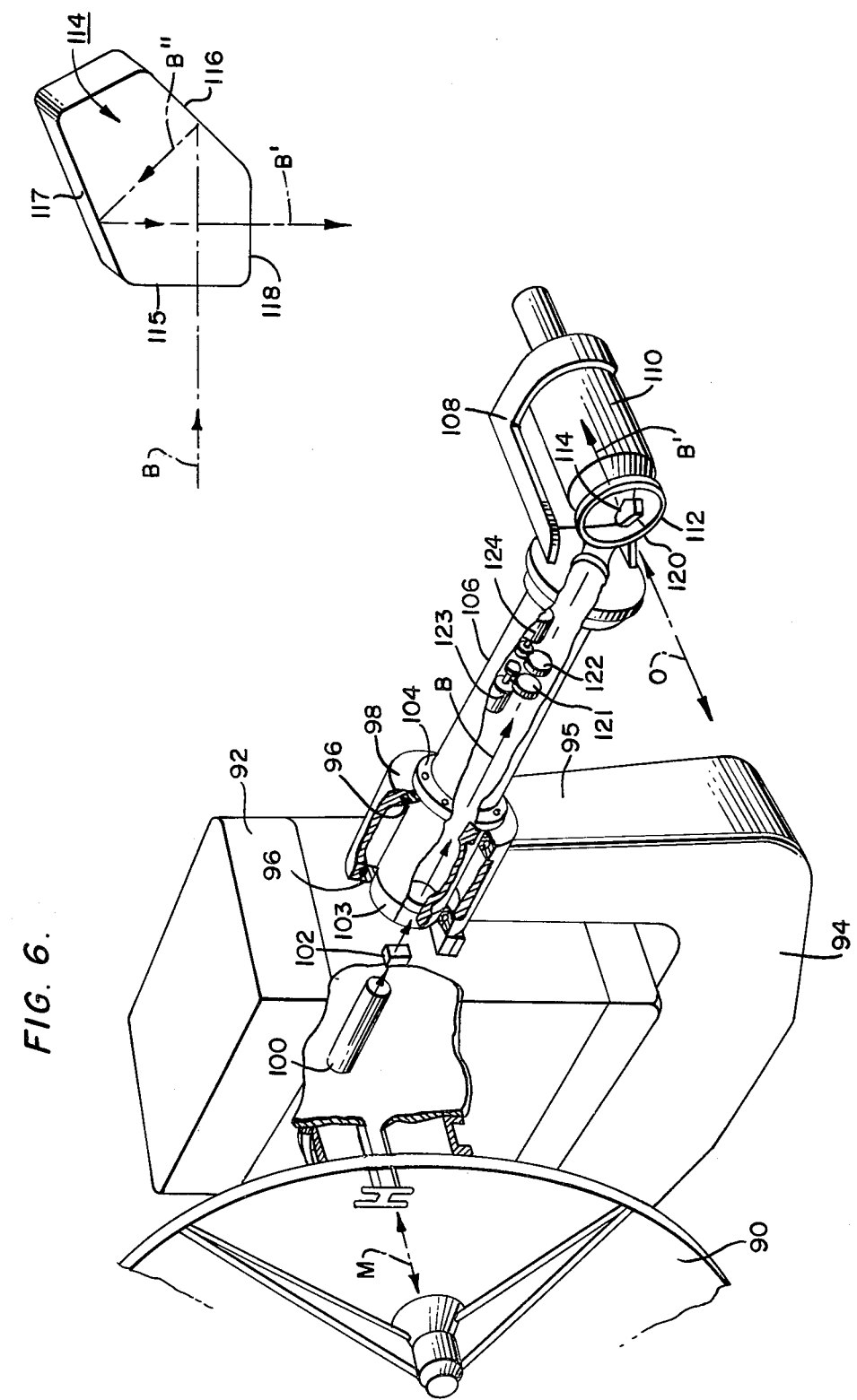

PROJECTED RETICLE OPTICAL SIGHTING SYSTEM

FIELD OF INVENTION

This invention relates to optical sighting systems for visually aiming the main operative axis of apparatus such as a radar antenna, a laser or a telescope, or a gun boresight, and more particularly relates to improvements in sighting systems where the optical sighting device is transversely offset from said main operative axis of the apparatus and where a reticle is projected into the optical sighting device from an image projector fixed directly to the main frame of the apparatus.

BACKGROUND AND PRIOR ART

Optical systems for the alignment of the main operative axis of an apparatus, such as a radar, are used to achieve angular alignment, or to measure misalignment errors, between the operative axis of the apparatus and the optical axis of the sighting device which is usually in the form of a small telescope having a lens system whose optical axis extends essentially parallel to the operative axis of the apparatus to which it is attached. Usually, the apparatus and the optical sighting system are supported on a common pedestal to achieve simultaneous rotation in azimuth and in elevation angle. Optical sighting is convenient where there are well defined visible targets whose relative location is accurately known. For example, in a case where it is necessary to align the azimuth measuring pick-off of a radar to true north, there may be a distinctive optical target such as a church steeple on the horizon whose bearing is known. Angular alignment of the north pick-off can be checked by directing the main axis of the apparatus toward the church steeple and checking its alignment with the optical sighting device, assuming that the optical sighting device has an axis which is set precisely parallel to the main axis of the radar, which comprises the RF axis of the antenna, and assuming the proper allowance is made for parallax between the main and optical axes.

In a typical radar antenna system which is not covered by a Radome, the optical axis of the sighting device presents little problem because the sighting device can be mounted in close proximity to the radar antenna, it being common practice to have the optical sighting line extend through a hole in the antenna reflector. In such a case, the mechanical alignment between the antenna and the optical axis of the sighting device can be maintained to very close tolerance. However, many high precision tracking radar systems have their antennas covered by a Radome in order to reduce the detrimental effects of sun heating and wind on the positioning of the antenna. Since in most cases the Radome cannot be made sufficiently transparent visually that the optical sighting device can see through it, it is accordingly necessary to offset the optical sighting device to one side of the antenna on an arm which extends through the Radome along the elevational axis of the antenna mounting, whereby elevational changes in the radar position will rotate the arm. The Radome frequently is mounted so that it rotates in azimuth with the antenna pedestal but does not rotate in elevation. The sighting device itself according to the prior art has a reticle incorporated into it which produces a substantially 1:1 correspondence between the angular motion of the optical sighting device and that of the reticle. However, a problem occurs in the prior art systems when the coupling arm which supports the optical device and the reticle flexes or vibrates, thereby causing angular misalignment between the optical sighting device and the main axis of apparatus being aimed at the target. Any mechanical motion of the optical sighting device will of course result in a faulty indication of alignment of the main operative axis of the apparatus, and the greater the offset due to length of the optical device coupling arm, the greater the error tends to be. This becomes even more serious when it is remembered that the optical sighting device necessarily has considerable mass which is concentrated at the outer end of the supporting arm, and this condition is still further aggravated when a television-type of sighting system is employed since the television camera must be included in the mass of the optical sighting device. The greater the length of the coupling arm, and the greater the mass of the optical device at its outer end, the heavier and more rugged the arm must be in order to minimize misalignment errors, and this additional weight is in many cases highly undesirable in a radar antenna system, or for that matter in other mounting systems to which the present invention may be applied as recited under the "Field of Invention" heading of this disclosure.

Quantitatively, in a high precision tracking radar system the angular position of a target being tracked can be determined in many cases with an over-all error of the order of 0.1 milliradian. This over-all error is the aggregate of individual contributing errors most of which are themselves substantially less than 0.1 milliradian. A typical specification for a permissible contributing error limit may be of the order of 0.03 milliradian. In many precision radar tracking systems, the azimuth accuracy tends to be better than the elevational accuracy, especially for low elevation angles. When a radar is tracking an aircraft at long range, such a low elevational angle is the usual case because of the limited altitude at which the aircraft can fly as compared with the range at which the radar can see the aircraft. The accuracy with which the aircraft altitude can be determined by means of radar at such low elevation angles is necessarily limited to the errors inherent in estimating the amount of bending effect of the RF beam caused by the troposphere, and by multipath reflections off of the earth's surface. Referring for the moment only to troposphere effects ("Radar System Analysis" by Barton, Prentiss-Hall 1964, Section 15.3) for example a ground radar system which is tracking an aircraft flying at an altitude of 15 kilometers and at a range of 300 kilometers experiences elevation bending of the radar RF beam of approximately 4 milliradians. The exact amount of bending depends on atmospheric parameters which are difficult to measure with great accuracy. As a result, often only approximate correctios can be made of the order of several tenths of a milliradian. In contrast, the azimuth or elevation angle accuracy of a high precision radar as mentioned above can be typically of the order of 0.1 milliradian in the absence of such atmospheric effects. Since the tropospheric and multipath bending effects are more pronounced in elevation, the azimuth data is usually considered better for long range aircraft targets. In air traffic control systems, the elevation of a cooperative aircraft can be determined by the aircraft's own instruments, such data being translated back to the ground radar. As a result of the foregoing, it is frequently advantageous to utilize means for maximizing azimuth data accuracy as compared with elevation data accuracy. This can be implemented by utilizing one of the further improvements taught below; namely, the use of a pentaprism oriented to minimize azimuth error.

THE INVENTION

The invention teaches several improved ways of mounting an optical sighting device offset from an apparatus having a main operative axis of its own, such as the RF axis of a radar antenna, the axis of a laser or telescope, or the boresight axis of a gun. The optical sighting device is in each case mounted at the end of an elongated arm or arms extending essentially transversely from the apparatus to which the optical sighting device is attached. In order to minimize any misalignment of the optical sighting device relative to the main operative axis of the apparatus to which it is attached, according to the present invention the reticle is not contained in the optical sighting device itself, but is projected into the lens system of the optical device by a separate reticle projector which is rigidly fixed to the frame of the apparatus with which it is associated. The path of the beam from the reticle projector to the optical sighting device may be made adjustable so as to permit accurate alignment of the reticle image with the main axis of the apparatus. The optical sighting device itself, e.g. a small telescope having its own lens system, is supported on an arm which is required to align the axis of the telescope only approximately with the operative axis of the apparatus. For distant targets, this alignment between the two axes should be mutually parallel, although it is possible that some other relationship may be desirable to account for parallax. On the other hand, the image of the reticle from the reticle projector which is mounted directly on the frame of the main apparatus must be directed into the front of the optical sighting device along a reticle beam axis which is exactly aligned in predetermined relationship with the main operative axis of the apparatus. The means which directs the reticle image into the optical sighting device can be mirrors or prisms, for example, mounted on a separate coupling arm from the mounting arm which supports the sighting device. Since the mirror arrangements can be very small, it has very little mass, and therefore it is easy to make the mirror coupling arm rigid enough to maintain accurate alignment of the reticle beam axis with the axis of the main apparatus. As a consequence, the heavy optical sighting device, which will be subject to more severe distortion and vibrational effects is separated from the reticle beam directing apparatus. It is well known that a lens system can be moved and vibrated relative to the visual path of an observer looking through it without moving the relative position of images produced by objects in the field of view. Because the projected reticle is effectively just one more image in the field of view, the image of the reticle will not move with respect to a target as a function of motion of the sighting device. Therefore, if the reticle beam axis can be made to precisely hold its angular position with respect to the axis of the main apparatus any misalignment of the remainder of the sighting system including the telescope will be tolerable in the present structure. A further improvement may be had by using a five-sided prism (or optical equivalent) at the outer end of the coupling arm instead of a mirror, because a pentaprism can experience a certain amount of misalignment in some planes without misaligning the reticle beam to the same extent.

It is a principal object of this invention to provide a sighting device including an optical lens system whose optical axis is laterally offset from the axis of the main apparatus to which it is attached, and wherein a reticle image is projected from a projector mounted directly to the main apparatus into the optical sighting lens system in such a way that the projection of the reticle beam is relatively much more stable and rigid than the mounting of the optical lens system of the sighting device, whereby a much smaller sensitivity to vibration or displacement of the sighting system with respect to the main apparatus is achieved for a given weight of mechanical arm structure supporting the sighting system.

It is another object of the invention to achieve this reduced sensitivity to displacement of the optical sighting system by mounting the relatively heavier optical lens system on one mounting arm, and by mounting the relatively lighter reticle beam directing system on another separate arm, both arms extending essentially laterally from the main operative axis of the apparatus.

It is another object of the present invention to decrease to a further extent the sensitivity of the optical sighting system to vibrations of the reticle beam directing device by using a penta-prism (or optical equivalent) instead of a mirror to direct the reticle beam from the reticle projector into the offset optical sighting device lens.

Still another object of the invention is to provide means for correcting the path of projection of the reticle image, which corecting means is separate from the mounting of the optical sighting device.

It is a further object of the invention to provide separate mounting arms respectively supporting the optical sighting lens system and the reticle beam directing device, wherein the two separate arms are coaxially arranged with the outer lens system supporting arm being the larger, and serving to protect the inner reticle beam directing device arm from damage, or from bending or displacements caused by sun and windage effects.

Other objects and advantages of the invention will become apparent during the following discussion of the drawings:

THE DRAWINGS

FIG. 6 is a partial perspective view of a modified practical embodiment of an optical sighting device supported on the frame and mounting yoke of a radar antenna; and FIG. 7 is a perspective view of a pentaprism for directing a reticle beam into a path at 90° with respect to the projected beam.

PREFERRED EMBODIMENTS OF THE INVENTION

Figure 1:
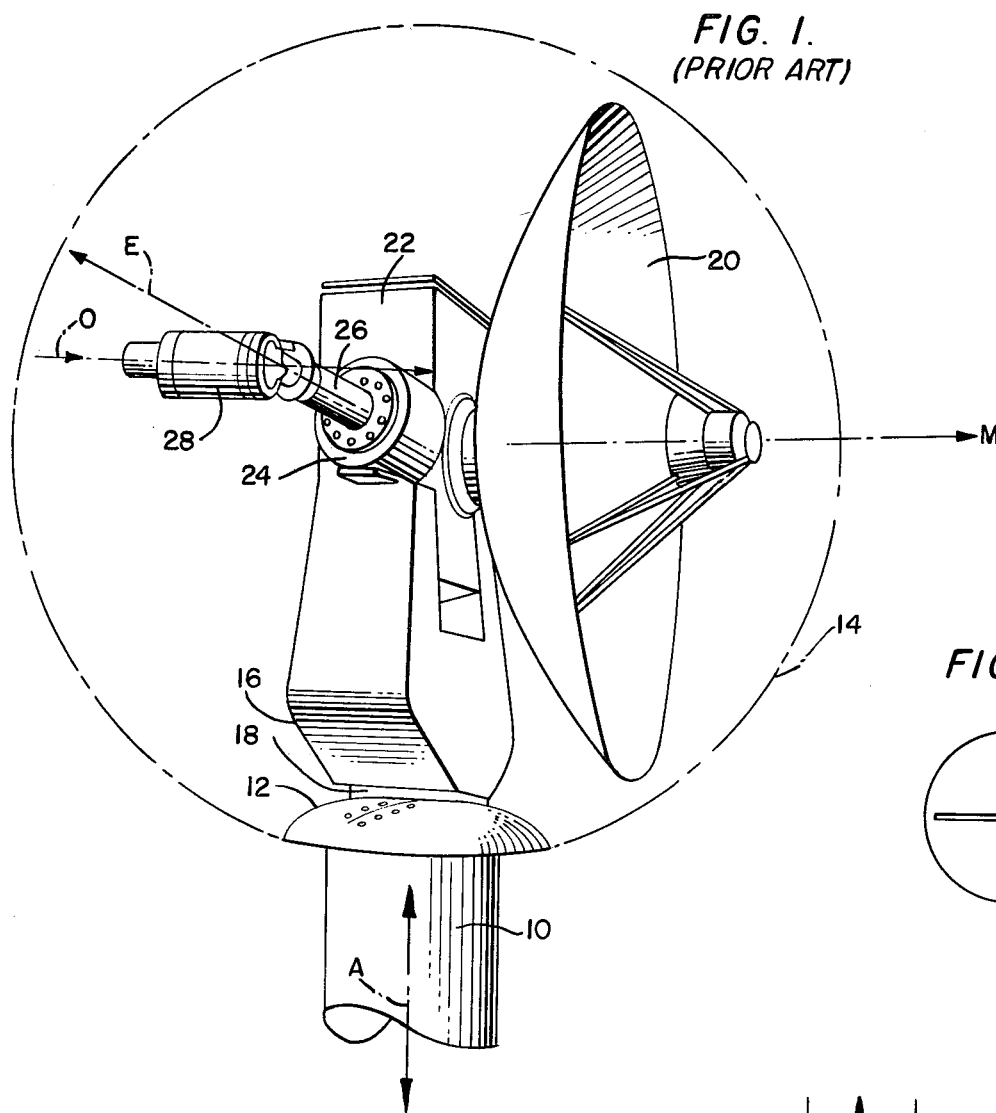
FIG. 1 is a perspective view of a prior art radar antenna rotatably mounted about a pedestal and a supporting yoke, a Radome being shown in phantom-lines around the antenna.

FIG. 1 shows a typical prior art precision radar system including a mast 10 ending at a platform having a flange 12 supporting a Radome 14 which is shown in phantom-lines. The mast 10 supports a U-shaped yoke 16 mounted on a drive pedestal 18 including a drive motor (not shown) for rotating the antenna about the azimuth axis A. The antenna includes a reflector 20 which is supported at its center on a box 22 which contains suitable transmission line coupling hardware. The yoke 16 supports on opposite sides a pair of spaced bearings, of which only the right-hand bearing 24 can be seen in FIG. 1, and one of these bearings will include an elevation drive motor (not shown) for driving the box 22 supported in the bearing 24 about the elevation axis E in a manner well known per se. In order to provide for optical sighting from a location outside of the Radome 14, an arm 26 extends outwardly from the bearing 24 and supports at its outer end the optical sighting device 28 which may comprise a small telescope, or which may alternatively comprise a television camera looking through a lens system and delivering a picture to associated display equipment. Within the prior art optical sighting device 28 there is mounted a reticle (not shown) which is aligned in such a way that its optical axis O nominally lies parallel to the main operative radar axis M. This sighting system is well known in the prior art and will not therefore be further described.

Figure 3:
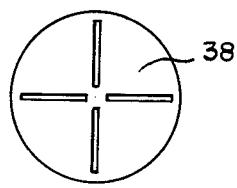
FIG. 3 is a front view of a reticle forming mask serving as part of a reticle projector shown in FIG. 2.
Figure 2:
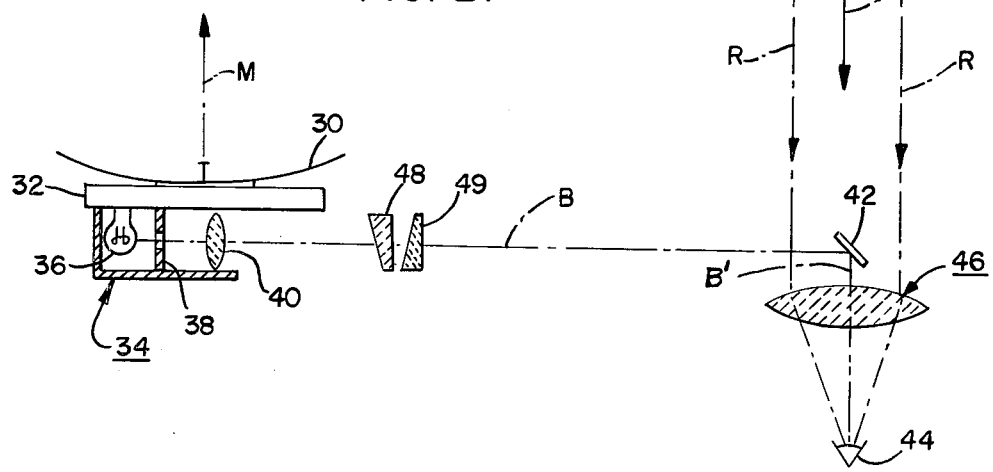
FIG. 2 is a schematic diagram showing the basic features of an improved optical sighting system according to the present invention.

FIGS. 2 and 3 show schematically an improved system according to the present invention for reducing the sensitivity of the optical sighting system to mechanical displacement or misalignment of the sighting lens 46 of a small sighting device or telescope, corresponding in function with the telescope 28 in FIG. 1. FIG. 2 shows a radar antenna 30 pointing in the direction of a main operative axis M and mounted on a transmission line coupling box 32. The box 32 serves as a frame for supporting a reticle image projector 34 including a light source 36, a mask 38, and a collimating lens system 40 suitable to project the reticle image along a path wherein the light rays from any one point on the reticle pattern are mutually parallel. FIG. 3 shows a plan view of the reticle mark 38 comprising a simple means for providing a crossed-line image to be projected along a reticle image beam path B, which is redirected by a mirror 42 into the eye of the observer schematically shown at 44. The lens system of the optical sighting device or telescope is represented by a schematic showing of a lens at 46 which focuses the image of a distant target into the eye of the observer along the optical axis O. The mirror 42 is made small so as to minimize its blockage of the parallel light rays R coming from a distance target at which the optical system is aimed. The system shown in FIG. 2 further includes a pair of optical wedges 48 and 49 which can be selectively rotated in such a way as to deflect the beam B of the reticle image in order to adjust it so that after it has been directed into the sighting device lens system 46 by the mirror 42, the portion of the beam labelled B' will be exactly parallel to the main axis M of the radar apparatus.

In the case where a TV camera is the sighting device, the camera may also be mounted in the arm 26, FIG. 1, with its optical axis facing outwardly and parallel to the system's elevation axis E. A mirror mounted at the end of arm 26 could direct the rays into the camera lens objective. This would improve the stability of camera mount.

An understanding of the principles of the invention can be had by considering the illustration of FIG. 2. For this purpose, let it be assumed that the radar apparatus has its main axis M aimed precisely at a target which is very distant so that parallax can be neglected. The reticle projector 34 is attached directly to the main frame of the antenna supporting box 32, and is rigidly supported substantially against that box so as to eliminate any movement between the reticle projector 34 and the antenna axis M. The central beam B of the reticle image is therefore precisely locked to the main axis of the radar apparatus, in this instance being directed at 90° with respect thereto as shown in FIG. 2. It is assumed that the optical wedges 48 and 49 have been selectively adjusted, in a manner well known per se, so that the beam B is indeed at a 90° angle with respect to the axis M. Now if it is assumed that the mirror 42 does not move and is properly adjusted, then the reticle image whose central beam B' is aimed into the optical system represented by the lens 46 will be directed precisely parallel to the main axis M of the radar. The above assumed conditions have been set forth in order to make the following point which is a basic point in this invention. As long as the reticle image arriving along the beam B' remains precisely aligned with the main operative axis M, the alignment of the lens system 46 optical axis O with the main axis M is relatively unimportant. In other words, a small displacement of the sighting device lens system 46, or a reasonable degree of misalignment thereof, will make virtually no difference in the over-all accuracy of the optical sighting system, assuming continued proper alignment of the reticle image beam B' with the main axis M. The present invention seeks to improve the stability of the positioning of the reticle image along the beam B' and to divorce the position of this image from the alignment of the optical axis O of the lens system 46 so that the latter can be permitted a certain amount of misalignment. There are certain practical design advantages to be obtained by the use of this approach, and these advantages will presently be discussed.

Figure 4:
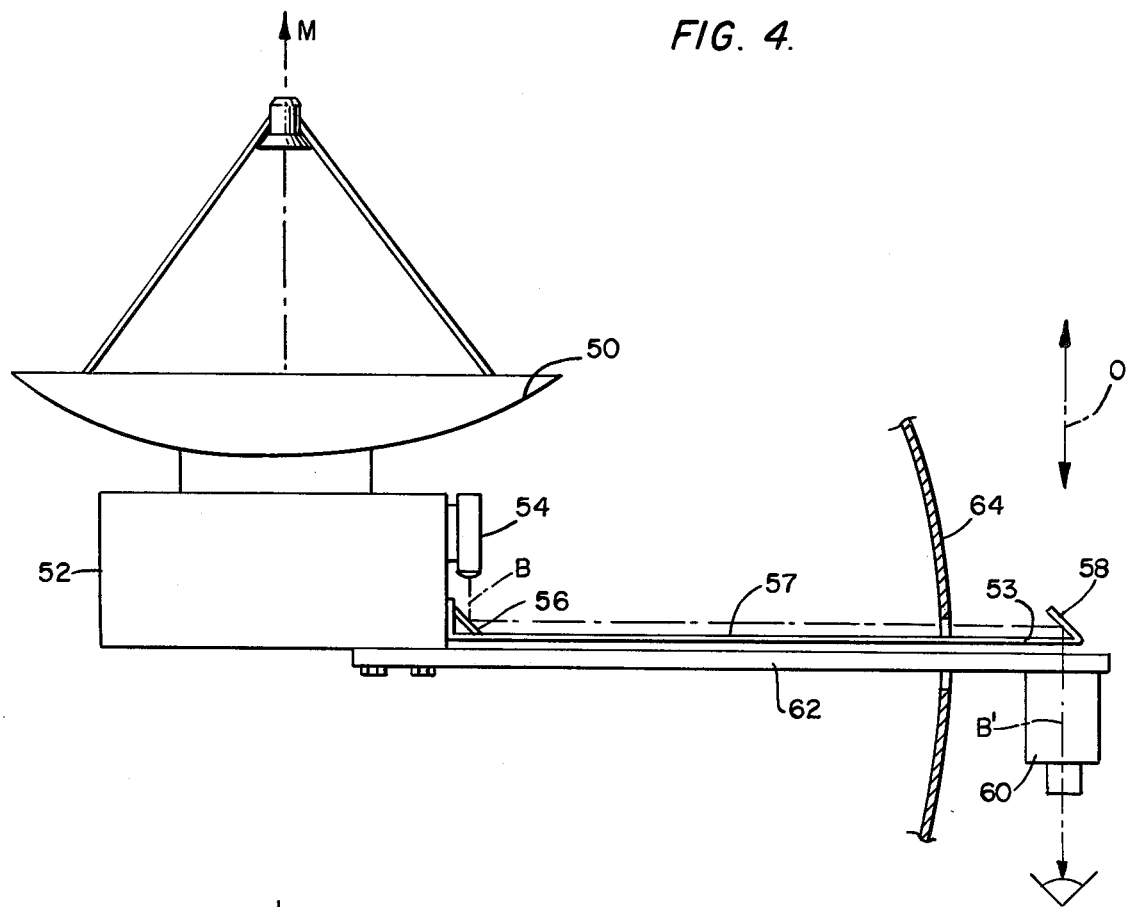
FIG. 4 is a simplified drawing showing an optical sighting system according to the present invention supported on the frame of a radar apparatus and extending through a Radome which is only partially shown.

Referring now to FIG. 4, this drawing shows a radar antenna represented by the dish 50 which is aimed along the main operative axis M of the radar apparatus and is supported on the box 52. The box 52 also supports a reticle projector 54 corresponding with the structure of the projector 34 shown in FIG. 2. This reticle projector 54, however, is mounted parallel to the main axis M of the radar, and its beam is reflected by a first mirror 56 and by a second mirror 58 so that the beam is offset and then returned to a path B' which is precisely parallel to the path M of the main operative axis. The outer mirror is supported by a coupling arm 57 which couples the mirrors 56 and 58 together and aligns them. The arm 57 is rigidly supported by the box 52 and forked near its outer end as at 53 to hold the mirror 58 at the selected angle as will be referred to hereinafter. The optical sighting device 60 is supported on a support arm 62 which is also rigidly secured to the box 52, and both of the arms 57 and 62 extend outwardly beyond a Radome cover 64 surrounding the antenna, this cover corresponds with the cover 14 shown in FIG. 1. In FIG. 4 the optical wedges to serve as a vernier alignment device for the beams B' have been omitted for the sake of simplicity. The drawing of FIG. 4 is quite schematic and is intended only to illustrate the priciples of the system.

It is to be particularly noted that the optical sighting telescope 60 is a rather heavy structure, and because of its mass it is difficult to support in a manner that will firmly and accurately hold its position without resorting to the extreme of using a very heavy supporting arm 62. On the other hand, the mirror 58 is very small and very lightweight and is therefore much less subject to displacement by vibrations. The mirror is therefore easy to support firmly on a lightweight coupling arm 57, because the mass of the mirror 58 is divorced from the mass of the telescope 60. As a result a much lighter weight arm can be used for both the arm 57 and the arm 62 while at the same time improving the stability of the optical sighting system and its resistance to vibration or displacement. The coupling arm 57 can be lightened because it need only provide rigid support for a lightweight mirror. The support arm 62 can be lightened because the optical sighting system 60 can now tolerate small displacements without sacrificing over-all accuracy. If the mirror 58 were supported on the arm 62, the latter would have to be greatly strengthened to achieve comparable stability for the over-all system.

Figure 5:
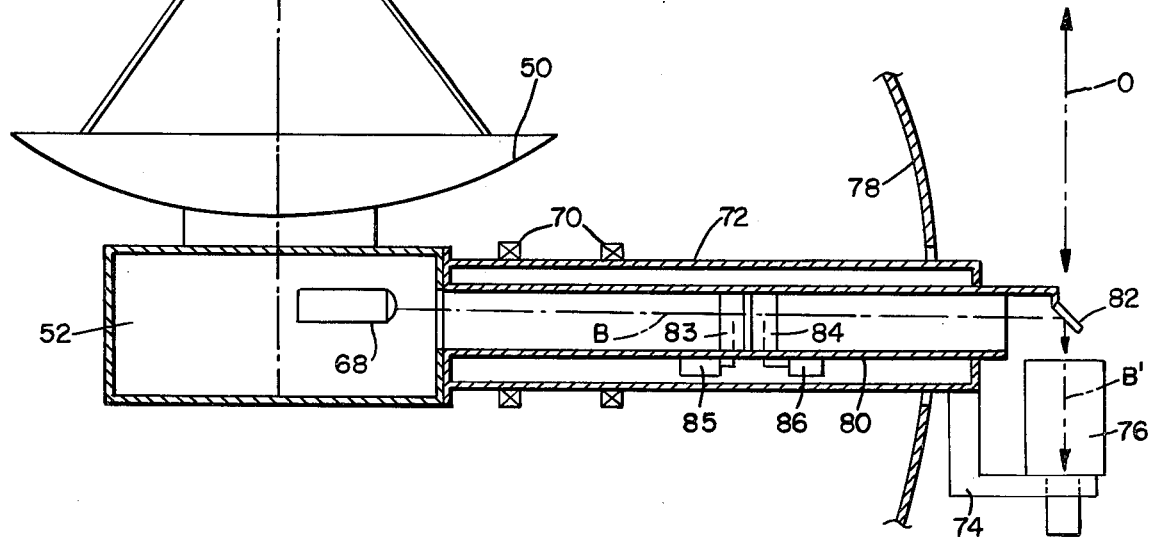
FIG. 5 is a simplified diagram partly in cross-section showing a modified form of optical sighting device according to the present invention attached to the frame of a radar antenna and extending through a Radome.

Referring now to FIG. 5, this figure shows a more practical preferred embodiment having a similar antenna represented by the dish 50 and a supporting box 52. In this embodiment a reticle projector 68 is mounted rigidly within the box 52 and projects the reticle image on a beam B which passes through the bearings 70 which support the box on the yoke. The outer support arm 72 comprises a tube having an offset bracket 74 at its outer end serving to mount the optical sighting telescope 76. This arm 72 passes through a hole in the Radome 78 so that the optical sighting axis O is located outside of the Radome. Within the tubular support arm 72 is a smaller coaxial tubular coupling arm 80 which is mounted at its inner end in the box 52 and passes through the arm 72 and the Radome 78 without touching them. Therefore, the support arm 72 acts as a shroud around the coupling arm 80 to protect it from wind, sun heating effects, and mechanical contacts which might cause physical displacements. The outer end of the coupling arm 80 supports a mirror 82 which directs the collimated reticle beam from the path B to the path B' which extends into the sighting device or telescope 76 and is intended to be exactly parallel to the main radar operative axis M. For this purpose, two optical wedges 83 and 84 are provided within the tube 80, and are mounted rotatably therein. A pair of stepping motors 85 and 86 are coupled so that they can be controlled selectively to rotate the wedges 83 and 84 for reticle beam alignment purposes.

FIG. 6 shows a modified embodiment of the invention which includes an antenna dish 90 supported on a box 92 which is in turn supported on both sides on a pedestal yoke 94 by bearings, one of which can be seen on the right-hand side comprising bearings 96 contained within a sleeve 98 which is welded to the top of the arm 95 of the yoke. The similar bearing located on the other side of the box 92 is not visible in FIG. 6. Within the box 92 is a reticle projector 100 which projects the reticle image through a small window 102 in the box and along the beam B of the reticle image. The bearings 96 support a hub 103 to which is mounted at a flange 104 the outer coaxial support arm 106 which supports a bracket 108 at its outer end in which the optical sighting telescope 110 is mounted. There is no inner coupling arm corresponding with the arm 80 in FIG. 5, but instead the outer end of the arm 106 also supports a ring member 112 which has spider arms 120 carrying a pentaprism 114 comprising the reticle beam directing means, and which can be seen in greater detail in FIG. 7. The pentaprism receives the beam B representing the image of the reticle, the beam passing through the surface 115 of the prism, reflecting from the surface 116 and from the surface 117 of the prism, and then passing outwardly through the surface 118 of the prism as the beam B' which enters the telescope 110 as shown in FIG. 6.

A substantial improvement in stability of alignment of the reticle image beam B' can be obtained by using a pentaprism as shown in FIG. 7 instead of a mirror such as the mirror 82 shown in FIG. 5. The pentaprism has two reflecting surfaces 116 and 117 which reflect the ray of light through a fixed angle which is somewhat independent of rotation of the prism about an axis perpendicular to the plane of the paper of the drawing in FIG. 7. This limited independence with respect to rotation of the prism about said perpendicular to the paper means that the coupling arm on which the prism is supported can experience a certain amount of displacement at its outer end without misaligning the beam B' from its parallel condition with respect to the main axis M of the radar. This is of course not true for all displacements of the pentaprism. For instance, rotation of the prism shown in FIG. 7 about an axis lying parallel to the portion B'' of the beam within the prism would cause displacement of the beam B' from the desired parallelism with the main axis M of the radar. However, the large cylindrical shape of the arm 106 and its coupling at the flange 104 is effective to minimize torsional rotations at the outer end of the arm about the arm's own axis, and therefore, the pentaprism will be quite stably supported. As a result of this relative insensitivity to displacement of the pentaprism, as compared with the sensitivity to displacement of a mirror similarly placed, only a single supporting arm 106 is used. The pentaprism is supported on a ring 112 which has spider members 120 supporting the pentaprism 114, the ring being attached to the outer end of the arm 106 and aligned with the optical axis of the telescope 110. FIG. 6 further includes a pair of rotatable optical wedges 121 and 122 driven by motors 123 and 124 in a manner well known per se to adjust the alignment of the reticle image beam as it passes through the arm 106.

Further improvements of the accuracy and stability of the sighting systems shown in others of the embodiments, such as in FIGS. 2, 4 and 5 of the drawings, can be had by replacing the mirrors comprising the reticle beam directing means which are located in the vicinity of the optical axis O with pentaprisms. Such a change would especially benefit the long range aircraft tracking applications by maximizing azimuth accuracy. This would be accomplished by orienting the pentaprism used to replace the mirror assembly in such a position that its operating faces 116 and 117 are approximately vertically oriented when the antenna is at zero elevation angle. In this orientation, most of the errors due to any displacement of the pentaprism would be elevational errors, and such errors would still be small as compared with the atmospheric bending errors occurring during low angle tracking. In such applications, it is practical to eliminate the requirement for a separate coupling arm supporting the pentaprism in the vicinity of the optical axis O and such elimination has been made in FIG. 6 as set forth above. The performance of the system shown in FIG. 6 would be improved by adding an inner arm corresponding with the arm 80 in FIG. 5 to support the pentaprism.

It is to be understood that the present invention may be used for optical sighting of other apparatus than radar, including but not limited to the examples mentioned above, such as the optical sighting of a laser beam, a telescope, or a gun boresight, etc. Moreover, other systems can be used for projecting and directing the reticle image, and of course other reticle patterns than the one shown in FIG. 3 can be used to form the image itself. Whether a pentaprism or a mirror is used for directing the reticle image along the beam B' into the optical sighting telescope, the directing means will be small in diameter as compared with the diameter of the telescope, and therefore will not seriously block its field of vision. The mirror could be replaced by a partially silvered surface through which the telescope would look toward the target, but which would reflect the image of the reticle into the telescope toward the eye of the observer.

As mentioned above, the exact RF axis of the antenna shifts somewhat when the RF frequency of the radar system is varied. Where a small variation of this sort is important, realignment of the reticle image beam B can be had by operating the stepping motors which turn the optical wedges. For this purpose, a chart can be made showing the proper stepping motor positions for various different frequencies of which the radar is capable.

Other optical sighting devices can be substituted for the telescopes 28, 46, 60, 76, and 110 shown in the drawings. These can be replaced by television cameras having their own lens systems directed along the optical axis O.

The present invention is not to be limited to the exact embodiments shown in the drawings, for changes may be made within the scope of the following claims.

We claim:

1. An optical sighting system for aiming the main operative axis of an apparatus to which it is attached in the direction of a target, the system comprising:
   (a) reticle projector means including means for forming the image of a reticle representative of the operative axis of the apparatus and means for collimating and projecting said image along a beam extending laterally outwardly with respect to said operative axis, the reticle projector means being mounted directly and rigidly on said apparatus;
   (b) an optical sighting device carried by the apparatus and including a lens system having an optical axis;
   (c) a supporting arm which is independent of the reticle projector means and which has an inner end attached to said apparatus at a mounting which is separate from the mounting of said reticle projector means and which has an outer end laterally offset outwardly beyond said apparatus, said outer end supporting the optical sighting device with its optical axis aligned substantially parallel to said main operative axis of the apparatus and intersecting the beam of the reticle image; and
   (d) directing means located along the optical axis of the sighting device and intercepting said projected reticle image beam and directing it into the optical device along a path whose axis bears a fixed and precisely predetermined angular relationship with said main operative axis.

2. The sighting system as claimed in claim 1, wherein said axis of said reticle image path is parallel to said main operative axis.

3. The sighting system as claimed in claim 1, further including a coupling arm which is fixed to said apparatus and which extends transversely with respect to said main operative axis, said image directing means being fixed to the coupling arm.

4. The sighting system as claimed in claim 3, including a tubular supporting arm fixed to the apparatus and carrying the optical sighting device at its outer end, and said coupling arm extending through said tubular supporting arm and carrying said image directing means at its outer end.

5. The sighting system as claimed in claim 3, wherein said image directing means comprises a mirror.

6. The sighting system as claimed in claim 3, wherein said image directing means comprises a pentaprism or the optical eqivalent.

7. The sighting system as claimed in claim 3, wherein said coupling arm is tubular, said reticle projector means being directed to project said image through the coupling arm to said directing means.

8. The sighting system as claimed in claim 7, wherein said system further includes optical wedges rotatably mounted inside said coupling arm in the path of the projected image, and means in the coupling arm for selectively rotating said optical wedges to adjust the path of the projected image passing through the arm.

9. The sighting system as claimed in claim 1, wherein said image directing means comprises a pentaprism supported in front of the line of sight of the optical sighting device and in the path of the projected reticle image.

10. The sighting system as claimed in claim 9, further including optical wedges rotatably mounted in the path of the projected image, and means for selectively rotating said optical wedges to adjust the path of the projected image.

* * * * *